Patented May 21, 1929.

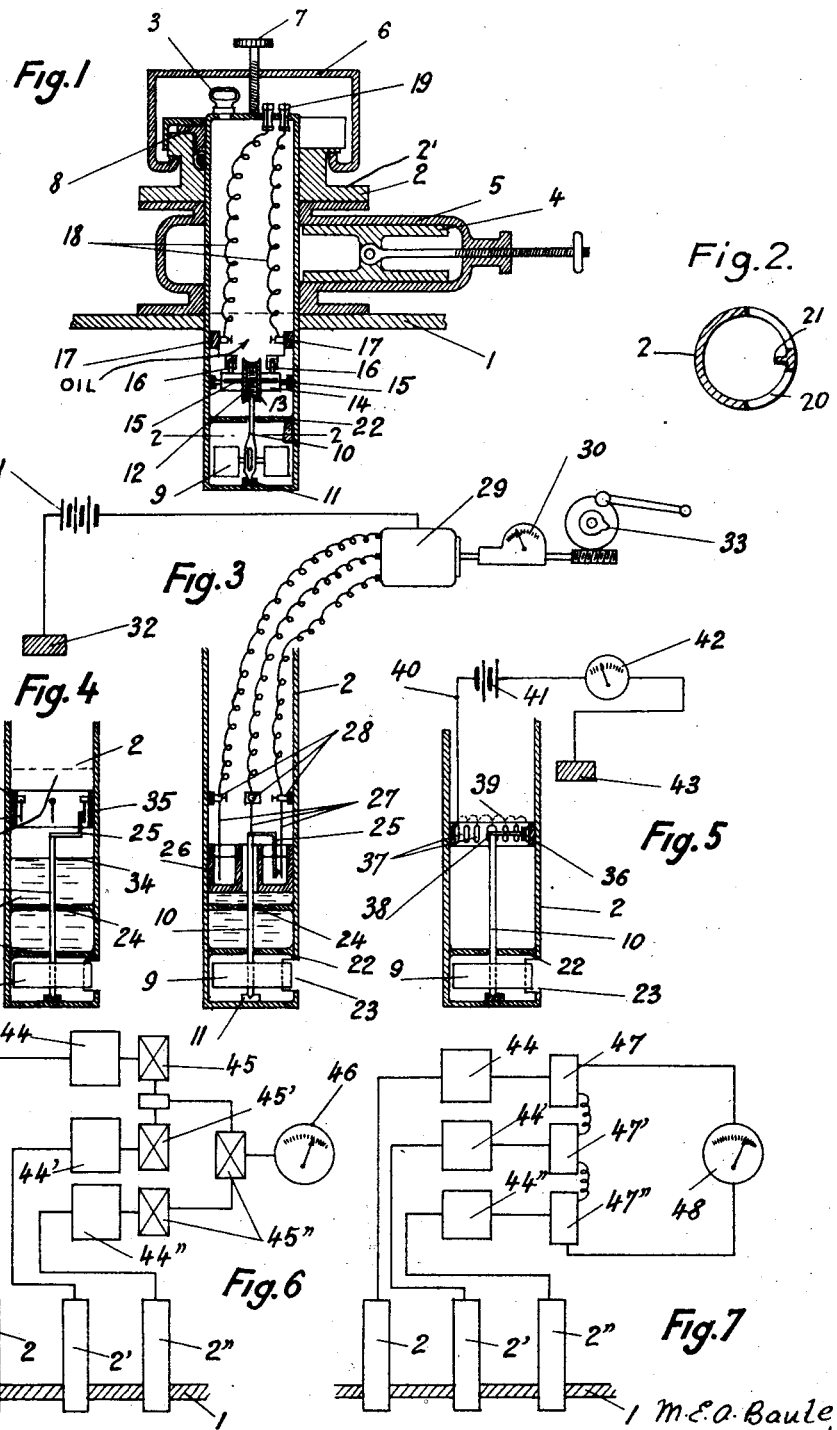

1,714,205

UNITED STATES PATENT OFFICE.

MARIE EMILE ALFRED BAULE, OF SCEAUX, FRANCE.

LOG CONSTITUTED BY A VANE WHEEL.

Application filed May 3, 1926, Serial No. 106,507, and in France May 4, 1925.

Amongst the several types of logs which serve to measure the speed of ships or of aircrafts there are several which are constituted by a screw secured to the ship or to the aircraft and which the stream of water or of air causes to rotate. The number of revolutions of the screw during an unit of time allows the speed of the ship or of the aircraft to be measured.

This number of revolutions is generally counted by means of an electric contact device which is actuated periodically at each revolution of the screw or preferably by means of a suitable speed reducing gear after a predetermined number of revolutions of the screw. This contact then controls a number of speedometers placed at various points.

In other types of logs the screw controls the rotating armature of a magneto machine producing current the voltage of which is in a certain ratio with the speed of the screw. A voltmeter can thus serve as a speedometer.

The above mentioned types of logs are defective because of the following reasons viz:

1. The resisting torque caused by the inertia of the parts controlled directly by the screw and by the frictional losses due to these parts prevents the screw from starting before the ship or aircraft has reached a certain speed, below which the log does not work.

2. A slight modification in the state of the rubbing surfaces causes the resisting torque to vary sufficiently to change the manner of working of the screw whereby the indications given out by the log cease to be accurate.

To remove the above mentioned errors, it has been proposed to make the parts directly controlled by the screw as light as possible and to dispose them as near as possible to the said screw, in view of diminishing to the utmost the inertia and the frictional losses due to the said parts. But in such arrangements the electric contact device will in the case of ships be quite close to the sea water and, the axis of the screw being necessarily horizontal and bathed by the current of water, it is very difficult to prevent the sea water from entering the electric device whereby the apparatus will be liable to work badly and to be speedily damaged by the electrolytic action caused by the presence of the sea water.

3. Lastly it can be stated in a general manner that the screw which is advantageous when used as a driving or propelling means because of its great efficiency is not adapted for accurate measuring because this efficiency is not constant.

My invention relates to a log which does not show any of the above mentioned drawbacks and of the type wherein the driving part is constituted by a vane wheel or turbine having a smaller but more constant efficiency than a screw. This vane wheel has its axis perpendicular to the motion of the ship and preferably vertical. This is a great advantage chiefly in view of protecting the electric parts as the axis disposed in this manner is not bathed by the current of water.

According to my invention, the parts directly controlled by the vane wheel or turbine are reduced to the utmost, whereby the log is actuated at all speeds, even the lowest.

An electric distant control device containing no parts rubbing together allows the movement of the turbine to be transmitted without substantially any braking of the driving part.

Besides, when used with ships, thanks to the vertical arrangement of the vane wheel shaft, the electric parts can be disposed inside an oil bath without the motion or the pressure of the water being allowed to remove this oil which by reason of the difference of its density with reference to that of the sea water is always urged upwards and remains above the said sea water.

Several forms of execution of a log as used with a ship built according to my invention are shown by way of example on appended drawings wherein:

Fig. 1 is a vertical sectional view of a first form of execution whereof Fig. 2 is a horizontal sectional view taken along line 2—2 of Fig. 1.

Fig. 3 is a vertical sectional view of a second form of execution wherein the speed indicating parts are controlled from a distance by a control device the transmitting part of which comprises a liquid resistance.

Fig. 4 shows a modified form of this second form of execution;

Fig. 5 shows a modified form of the distant control device;

Fig. 6 is a diagrammatical view showing several logs working simultaneously and disposed at several points of the hull in view of giving out a mean speed at the central speed-indicating station.

Lastly Fig. 7 shows a modified form of this arrangement of several logs.

In the form of execution shown in Figs. 1 and 2 the horizontal bottom 1 of the hull is provided with an aperture wherein the tube 2 containing the vane wheel is inserted. This tube can be manipulated by the handle 3 which allows the tube to be secured to or removed from the aperture in the hull. This aperture can be closed when the tube is removed by a valve constituted by a slide 4 moving inside the casing 5.

A securing flange 6 prevents the tube 2 from being raised by the pressure of the water on the outside of the hull and a screw 7 passing through this flange allows the tube to be adjusted as to height. A stuffing-box 8 is suitably disposed between the tube 2 and its support 2'.

Inside the tube 2 is disposed the vane wheel 9 the vertical axis 10 whereof rests by its lower point on the step bearing 11 borne by the bottom of the tube 2 and which can be made of lignum vitæ for instance. The axis 10 ends at its top extremity with a worm 12 meshing with a worm wheel 13 secured to a drum 14 made of insulating material and bearing conducting strips such as 15. These different strips are connected together by means of suitable connections disposed inside the drum 14.

The contact rollers 16 are adapted to bear on the drum 14 and are electrically connected with the terminals 17 which are in their turn connected through the wires 18 with the insulated terminals 19 secured in a watertight manner through the top of the tube 2. A suitable indicating device (not shown) is connected with the terminals 19.

In front of the vanes of the wheel 9 the tube 2 is partially cut open as shown at 20 (Fig. 2), a partition 21 being left in order to ensure the rigidity of the tube. The sea water can thus enter inside the tube 2 and actuate the vanes of the wheel. A horizontal partition 22 through a central opening in which the shaft 10 of the vane wheel is adapted to pass is disposed inside the tube 2 above the wheel. The part of the tube disposed above this partition 22 is full of oil wherein the electric contact device bathes. It can under no circumstances mix with the sea water which occupies the lower part of the tube.

In the form of execution shown on Fig. 3 the log is constituted in the same manner as in the above described form of execution, except as concerns the tube 2 which instead of being partially cut open is provided with a simple hole 23 through which the vanes of the wheel 9 are allowed to project whilst they pass in front of it. Besides the shaft 10 is borne by a ball bearing 24. This log is devised so as to transmit at a distance the indications concerning the speed. The control device consists in an arrangement the transmission station of which comprises a liquid resistance or an electrolytic contact such as the one I have described in my British Patent 228,166 filed on January 21, 1924, and illustrated more particularly on Figs. 3 and 4 of said patent. In view of this the shaft 10 bears a conducting rod 25 dipping inside an annular container 26 wherein is disposed a liquid of small conductivity. The container 26 is also provided with stationary insulated rods 27 each connected with a terminal 28 insulated from the tube 2. The terminals 28 are in their turn connected with the terminals of a controlled motor 29 actuating a speedometer 30. The circuit of the electric source 31 is closed through the grounded plate 32.

The working is the following: When the wheel 9 rotates under the action of the water, it actuates the rod 25 the angular distance of which to the several stationary rods 27 varies therefore in a continuous manner as the said rod 25 rotates in front of the stationary rods. The resistance of the liquid inserted in the circuit corresponding to these rods varies thus continuously. Thereby a variable voltage is produced at the terminals of the receiving motor 29 which controls the speedometer 30. The motor 29 is preferably of the well known type described for instance in my prior above mentioned British specification, which comprises a number of cooperating phases connected with the terminals corresponding to the several stationary rods whereby the A. C. due to the variable voltages at the terminals of the motor causes a rotating field to arise in the motor and the rotor to move by an angle corresponding to the rotation of the rod 25 and therefore to the speed of the vane wheel. This motor can also, by means of a suitable speed reducing gear, rotate a contacting cam 33 controlling a track recorder.

In a modified form, no annular container 26 is used. In this case (Fig. 4) the oil fills the tube 2 only up till a certain level 34 and the tube contains above this level a badly conducting liquid lighter than oil. Inside the tube 2 and along the wall thereof is disposed at a height corresponding to the badly conducting liquid an insulating sleeve bearing the stationary rods 27 and the terminals 28.

Any other combination of dry or electrolytic contacts can be used, for instance a series of contact mounted in parallel and adapted to come in contact successively with a roller actuated by the shaft of the wheel. The frequency of the current impulses thus produced is in a given ratio with the speed and can be measured by a frequency meter. A form of execution of such an arrangement is shown on Fig. 5. The shaft 10 of the wheel 9, suitably bent at its top end is provided with a roller 36 adapted to rub against stationary contacting parts 37 borne by an insulating sleeve 38. These contacting parts are mounted in parallel and connected through the connections 39. One of them is connected through a wire 40 with one of the poles of an electric supply 41 the other pole of which is connected with one of the terminals of a frequency meter 42. The second terminal of the frequency meter is connected with a grounded plate 43.

A number of log tubes similar to those described hereinabove can be disposed along the hull 1 whereby the mean speed of the water along the hull can be ascertained. In view of this the several logs are disposed so as to actuate at a distance a number of speedometers disposed so as to let the mean speed be given out by a suitably disposed central speedometer. The totalizing of the several speeds given by the logs is obtained by a mechanical or electrical arrangement of any suitable type.

In the form of execution shown on Fig. 6, the different log tubes 2, 2', 2'' placed at different points of the hull 1 actuate each a motor 44, 44', 44'' through a distant control system. These motors each control a differential device or totalizer 45, 45', 45'' suitably connected with a speedometer 46 which gives thus the mean speed.

Fig. 7 shows an electric totalizing device. The controlled motors 44, 44', 44'' actuated by the logs 2, 2', 2'' control each the movable part of a magneto machine 47, 47', 47''. These several magnetos are connected in series and connected with the terminals of a voltmeter 48. The voltage given out by the voltmeter is the sum of the three voltages of the magneto machines 47, 47', 47'' whereby the voltmeter gives out the mean speed which is in a given ratio with this total voltage.

Evidently the vane wheel or turbine can be of any suitable type and for instance it can be constituted by a cylinder which may be outwardly corrugated or striated or even completely smooth.

What I claim is:

1. A log for measuring the speed of a ship the hull of which is provided with an aperture, comprising a vertical tube closed at its lower end, adapted to project through the aperture and beyond the hull and provided with apertures in its side walls near the lower end thereof, a bearing on the bottom of the said tube, a vertical shaft resting freely thereon and disposed inside the vertical tube, a vane wheel secured to said shaft and entirely contained inside the tube with the vanes thereof projecting in front of the aperture therein, a receiver, means driven by the vane wheel, electrical means actuated thereby and adapted to control the receiver and means for securing the tube in operative position.

2. A log for measuring the speed of a ship the hull of which is provided with an aperture, comprising a vertical tube closed at its lower end, adapted to project through the aperture and beyond the hull and provided with apertures in its side walls near the lower end thereof, a bearing on the bottom of the said tube, a vertical shaft resting freely thereon and disposed inside the vertical tube, a vane wheel secured to said shaft and entirely contained inside the tube with the vanes thereof projecting in front of the apertures therein, a receiver, an electric contact device disposed in the tube adapted to be periodically actuated by the vane wheel shaft and disposed above the level of the sea water in the tube, a liquid filling the tube above the sea water and in which the contact device bathes, receiver wires operatively connecting the receiver with the said contact device and means for securing the tube in operative position.

3. A log for measuring the speed of a ship the hull of which is provided with an aperture, comprising a vertical tube closed at its lower end, adapted to project through the aperture and beyond the hull and provided with apertures in its side walls near the lower end thereof, a bearing on the bottom of the said tube, a vertical shaft resting freely thereon and disposed inside the vertical tube, a vane wheel secured to said shaft and entirely contained inside the tube with the vanes thereof projecting in front of the apertures therein, oil filling the tube above the sea water level, a liquid of small conductibility lighter than oil filling the tube above the oil, a rod secured to the vertical shaft and bathing in said liquid, conducting rods dipping in said liquid outside the path of the first mentioned rod, a receiving motor, conducting wires connecting the motor respectively with the first mentioned rod and with the insulated rods, a speedometer controlled by said motor, and means for securing the tube in operative position.

In testimony whereof I have affixed my signature.

MARIE EMILE ALFRED BAULE.